US00H002144H

(19) United States
(12) Statutory Invention Registration
Baechtle et al.
(10) Reg. No.: US H2144 H
(43) Published: Feb. 7, 2006

(54) LAYERED OPTICAL CIRCUIT

(75) Inventors: David Robert Baechtle, Dillsburg, PA (US); Dwight David Zitsch, Marysville, PA (US); Brian Patterson, Lewisberry, PA (US)

(73) Assignee: Tyco Electronics Corporation, Middletown, PA (US)

(21) Appl. No.: 10/341,829

(22) Filed: Jan. 14, 2003

(65) Prior Publication Data

US 2004/0136638 A1 Jul. 15, 2004

(51) Int. Cl.
*G02B 6/12* (2006.01)

(52) U.S. Cl. ..... 385/14

(58) Field of Classification Search ..... 385/14, 385/114, 137; 398/164
See application file for complete search history.

(56) References Cited

U.S. PATENT DOCUMENTS

| | | | | |
|---|---|---|---|---|
| 5,204,925 A | | 4/1993 | Bonanni et al. | 385/89 |
| 5,259,051 A | * | 11/1993 | Burack et al. | 385/76 |
| 6,005,991 A | | 12/1999 | Knasel | 385/14 |
| 6,352,374 B1 | * | 3/2002 | Selfridge et al. | 385/76 |
| 6,381,396 B1 | * | 4/2002 | Grois et al. | 385/137 |
| 6,425,691 B1 | | 7/2002 | Demangone | 385/53 |
| 6,427,034 B1 | | 7/2002 | Meis et al. | 385/14 |
| 6,516,121 B2 | * | 2/2003 | Laor | 385/49 |
| 6,535,684 B1 | * | 3/2003 | Kondo et al. | 385/137 |
| 6,554,483 B1 | * | 4/2003 | Sun et al. | 385/59 |
| 2003/0007773 A1 | * | 1/2003 | Kondo et al. | 385/137 |

FOREIGN PATENT DOCUMENTS

JP 2002-365448 A * 12/2002

OTHER PUBLICATIONS

Michael Hughes & Kevin White, US CONEC, "Update on Optical Circuit Technology", Tech Focus (www.fpnmag.com) Fiberoptic Product News (Apr. 2002) (2 pp.).

Concours TM Optical Circuits, 2×3, USCONEC Products [online] [Retrieved on Aug. 2, 2002] Retrieved from the Internet using http:/www.usconec.com/pages/product/circuit/mainfrm.htm (1 p.).

Concours TM Optical Circuits, 32 Channel, Stacked Ribbon Circuit, USCONEC Products, [online] [Retrieved on Aug. 8, 2002] Retrieved from the Internet at http://www.usconec.com/pages/product/circuit/mainfrm.html (1 p.).

(Continued)

*Primary Examiner*—Daniel Pihulic
(74) *Attorney, Agent, or Firm*—Stephen J. Driscoll; Robert J. Kapalka; Driscoll A. Nina, Jr.

(57) ABSTRACT

A layered optical circuit including a multi-substrate optical circuit. The multi-substrate optical circuit includes a plurality of optical fibers, a first substrate supporting a first portion the optical fibers to form a first optical subcircuit, and a second substrate supporting a second portion of the optical fibers to form a second optical subcircuit. A third portion of the optical fibers between the first and second portions extends between the first and second substrates. Free fibers in the third portion are elongated to permit repositioning of the first and second optical subcircuits in an overlapping arrangement without exceeding a minimum bend radius of each of the optical fibers. The overlapping arrangement of the first and second optical subcircuits forms a layered optical circuit. Accordingly, a layered optical circuit having a large number of fibers and/or a complex circuit pattern may be affixed on a relatively small footprint of a backplane, etc.

22 Claims, 10 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

OTHER PUBLICATIONS

Concours NP TM (Non–Planar) Optical Circuits, US CONEC Products, [online] [Retrieved on Aug. 7, 2002] Retrieved from the Internet using URL http://www.usconec.com/pages/product/circnp/mainfrm.html (1 p.).

FlexPlane, FlexPlaneIntroduction [onlineline] [Retrieved Aug. 7, 2002] Retrieved from the Internet using URL http://www.molex.com/cgi–bin/bv/molex/family/intro.jsp-?page Title=Introduction&oid=9356&BV_Session ID=@@@@ 1360753340.1028754877.

Fujikura, "Connecorized Optical Fiber Circuits 026" [online] [Retrieved Aug. 27, 2002] Retrieved from the Internet using http://www.fujikura.co.jp/cnc/eng/pdf_files/english/cnce005.pd (2pp.).

Mitsubishi Cable, "Optical Fiber Circuit Sheet" [online] [Retrieved Aug. 27, 2002] Retrieved from the Internet using http://www.mitsubishi–cable.co.jp/product/hikari/circuit.pdf (1 p.).

M. Shahid, P. Wang and J. Hicks, "Flexible High Density of Optical Circuits", National Fiber Optic Engineers Conference, 2001 Technical Proceedings, [online] [Retrieved Aug. 27, 2002] Retrieved from the Internet using http://www.ofsoptics.com/resources/flexhighdensitycircuits.pdf (pp. 580–587).

Molex Flen Plane, Molex Welcome Connectors Interconnects electrical, electronic, etc., [online] [Retrieved Dec. 10, 2002] Retrieved from the Internet using http?llwww.molex.com/egi–bin/by/molex/index_login.jsp?x=y&BF_Session ID=@@@@1944396151.10395 (1 p.).

* cited by examiner

10

LAYERED OPTICAL CIRCUIT

FIELD OF THE INVENTION

The present invention relates generally to optical circuits, and particularly to a multi-layered optical circuit.

DISCUSSION OF RELATED ART

Advances in optical networks, systems and connectors have resulted in a need to manage an increasing number of optical fibers in limited space. Numerous optical fibers are often managed by creating an optical circuit. An optical circuit includes a substrate to which optical fibers are arranged in a desired circuit pattern and permanently fixed to accomplish a desired fiber management, shuffling, cross-connection or distribution scheme. A typical optical circuit 10 (see FIGS. 1A–1D) includes a substrate 12, such as a flexible sheet of Kapton®, supporting a layer of pressure-sensitive adhesive (not shown). Individual fibers or bundles of fibers (e.g. ribbons) 20 are laid and/or pressed onto the adhesive layer, e.g., by a CNC fiber-routing machine (not shown), in the desired circuit pattern. A protective layer (not shown) may be applied on top of the fibers to help hold them in place. The protective layer is typically a plastic, e.g. silicone-based, coating that conforms to the profile of the fibers and provides uniform coverage.

Lengths of the fibers extending beyond the edge of the substrate form termination legs 22 that are terminated with the desired connectors 24 (see FIG. 1A), such as LIGHT-RAY MPX® brand connectors. MTP®, MT-RJ or other MT-type connectors, LC-, FC-, or SC-type connectors, etc. Optically, the termination legs may be ribbonized for subsequent routing and/or convenient terminating to multi-fiber connectors. Exemplary optical circuits are shown in FIGS. 1A, 1B, 1C and 1D. For reference, U.S. Pat. No. 5,204,925 to Bonanni et al., U.S. Pat. No. 6,005,991, to Knasel, U.S. Pat. No. 6,425,691 B1 to Demangone, and U.S. Pat. Nos. 6,427,034 B1 to Meis et al., the entire disclosures of which are hereby incorporated herein by reference, describe technology in technical areas similar to this application.

Applicant has observed that such optical circuits, though often flexible out of plane and/or having a thickness, are "planar" in that they involve either: (a) laminating portions of fibers between adjacent fiber end connectors to a single substrate; or (b) routing fibers between adjacent connectors in a single plane, on one side of a single substrate.

Such planar optical circuits are limited in the number of fibers that can be routed upon a given area of substrate. Such limitations are primarily due to a minimum bend radius characteristic of the fibers, and a maximum number of fibers that can be physically routed in stacked arrangement before causing microbends and microbend loss.

SUMMARY

The present invention provides a multi-substrate optical circuit and a layered optical circuit fabricated from the multi-substrate optical circuit. The multi-substrate optical circuit is similar to a conventional planar optical circuit in that it includes optical fibers affixed to a substrate to provide a desired circuit pattern, and in that portions of the optical fibers extend beyond the substrate(s) to form termination legs for termination to desired connectors. Hence, conventional optical circuit fabrication materials, techniques and equipment may be used to fabricate the multi-substrate optical circuit. The multi-substrate optical circuit differs from a conventional planar optical circuit, however, in that the optical fibers are routed between and bonded to multiple distinct substrates. The substrates thereby become interconnected by a free, unaffixed length of the optical fibers that permits bending of the fibers to stack the individual substrates in an overlapping manner to form a layered optical circuit in accordance with the present invention. The length should be sufficient to permit such bending without violating a minimum bend radius of the fibers. Accordingly, a continuous communications path is provided across multiple substrates, and across multiple layers of overlapping substrates.

In this manner, the layered optical circuit achieves a smaller form factor for an overall optical circuit by overlapping, e.g. stacking, planar optical subcircuits fabricated in a manner similar to that well known in the art. Accordingly, a relatively large layered optical circuit may occupy a relatively small footprint of a backplane, carrier, etc. The layered optical circuit provides a greater area of substrate for routing of fibers in a given footprint, and, therefore, a greater number of fibers, and/or a more complex circuit pattern, may be routed over that footprint while avoiding bend radius and microbend problems.

A method for fabricating a multi-substrate optical circuit and a layered optical circuit is also provided.

DETAILED DESCRIPTION

Conceptually, the present invention provides an optical circuit that is layered to achieve a smaller form factor for an optical circuit by overlapping, e.g. stacking, multiple interconnected planar optical circuits. A layered optical circuit provides a greater area of substrate for routing of fibers in a given footprint (e.g. surface area on a backplane or carrier), and, therefore, a greater number of fibers, and/or a more complex circuit pattern, may be routed over that footprint while avoiding bend radius and microbend problems. The optical circuit may be constructed from a multi-substrate optical circuit including separate substrate supported optical subcircuits connected by free fibers having a length sufficient to permit overlapping of the substrates while maintaining at least a minimum bend radius for the fibers.

Figure 1A:
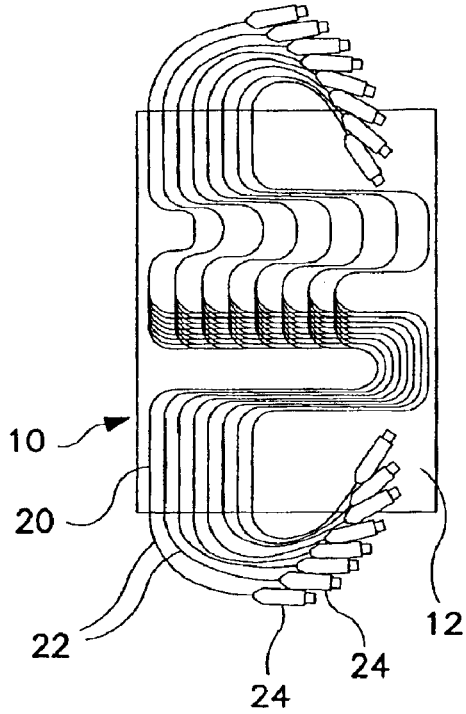
FIG. 1A PRIOR ART
FIGS. 1A–1D are top views of exemplary prior art planar optical circuits.
Figure 1B:
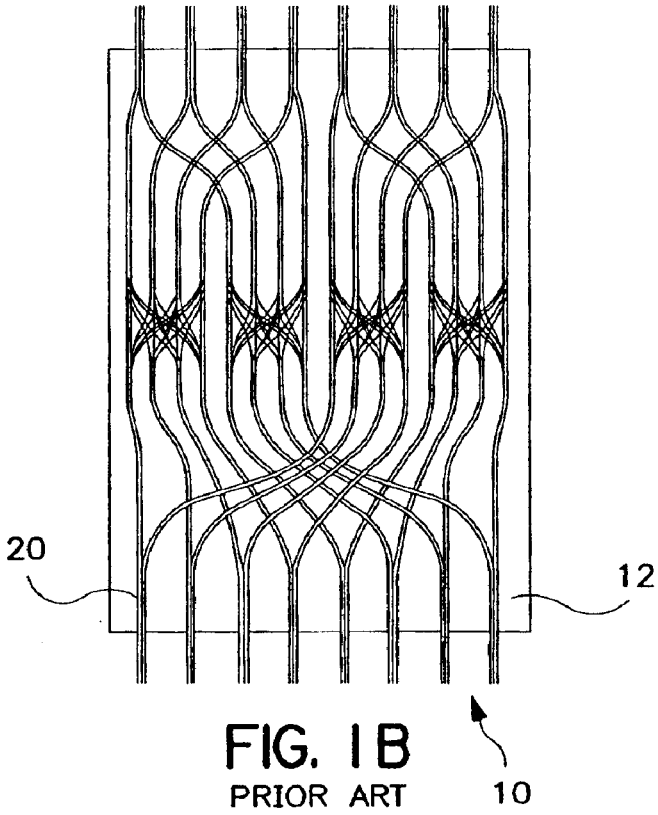
FIG. 1B PRIOR ART
Figure 1C:
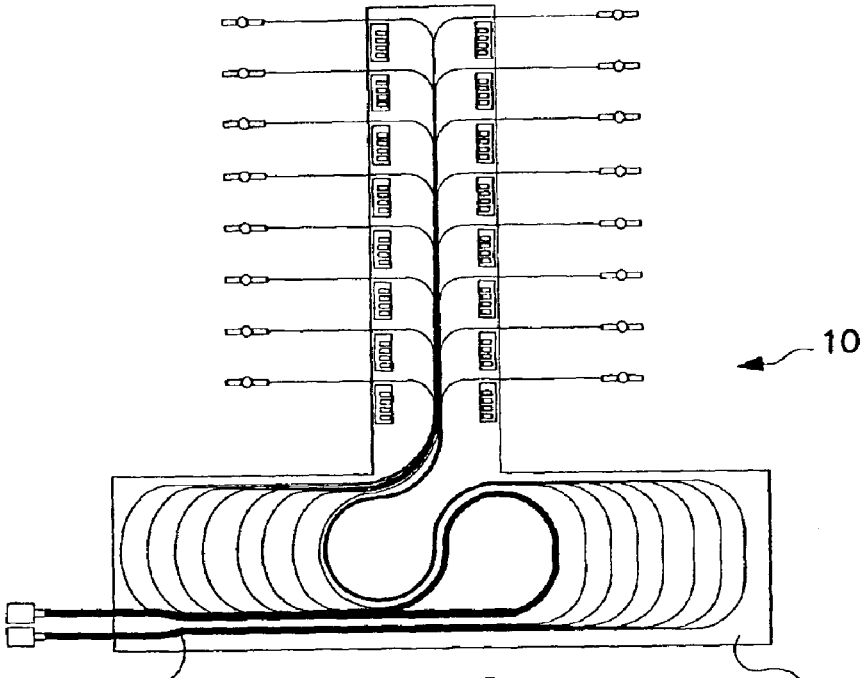
FIG. 1C PRIOR ART
Figure 1D:
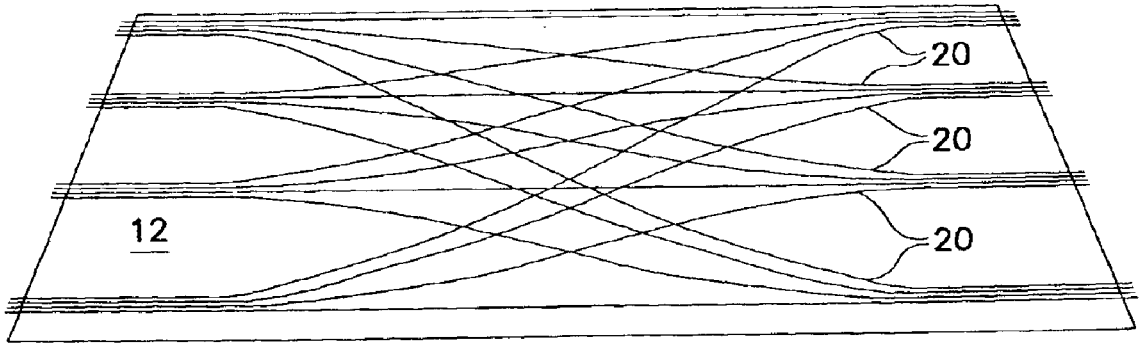
FIG. 1D PRIOR ART
Figure 2B:
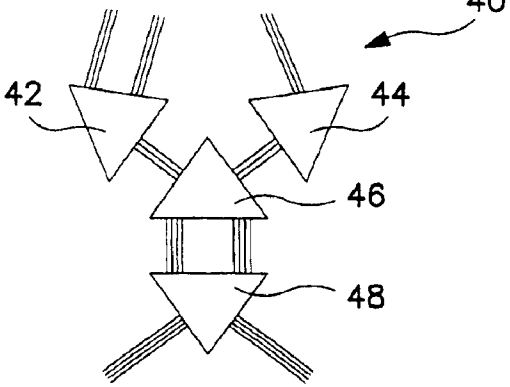
FIGS. 2A–2C are top views of exemplary multi-substrate optical circuits for forming a layered optical circuit in accordance with the present invention.
Figure 2C:
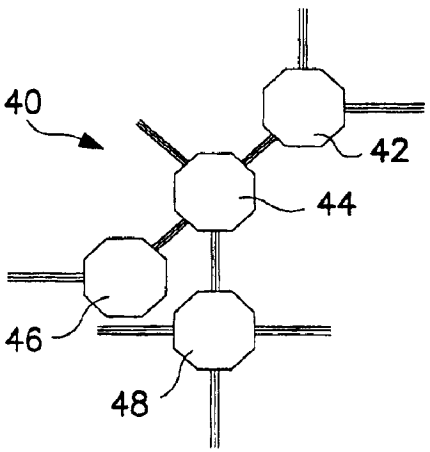
Figure 2A:
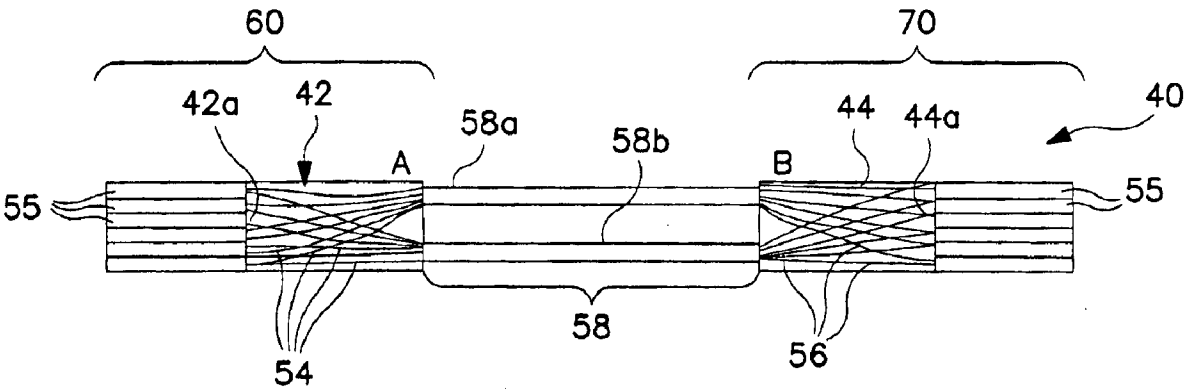

FIGS. 2A–2C are top views of exemplary multi-substrate optical circuits 40 for forming a layered optical circuit in accordance with the present invention. The exemplary multi-substrate optical circuit 40 of FIG. 2A includes two substrates 42, 44. The desired number of fibers, which may or may not be ribbonized, are affixed to the first and second substrates 42, 44 using fabrication techniques generally known in the art for forming optical circuits, to achieve the desired circuit pattern (exemplary shuffle pattern shown) and provide termination legs 55 extending beyond substrate edges 42*a*, 44*a* to which the desired connectors (not shown) may be applied. It will be understood that additional fibers may be part of the layered optical circuit although they are not affixed to both the first and second substrates.

More specifically, the first substrate 42 supports a first portion 54 of each the optical fibers, e.g. by supporting the fibers on a pressure sensitive adhesive coating of the substrate 42 and/or fixing them with a protective layer, as generally known for planar optical circuits, to form a first optical subcircuit 60. The second substrate 44 supports a second portion 56 of each of the optical fibers, e.g. by arranging the fibers on a pressure sensitive adhesive coating of the substrate 42 and/or fixing them with a protective layer as generally known for planar optical circuits, to form a second optical subcircuit 70. Each of the first optical subcircuit 60 and second optical subcircuit 70 is therefore similar to a planar optical circuit of the prior art. However, the subcircuits 60, 70 are interconnected by free fibers to form a continuous communication path across these, and potentially other, substrates. As used herein, the term "free fiber" refers to fibers that are not affixed to a substrate, regardless of whether such fibers are ribbonized.

It will be appreciated by those skilled in the art that optical fibers, particularly when ribbonized, have limited flexibility for bending while maintaining desirable signal transmission capabilities. This is partly due to the structure of flat, multi-fiber ribbons which readily permit bending primarily out-of-plane, but prevents substantial bending in-plane. This limited flexibility is accounted for in constructing a multi-substrate optical circuit for fabrication into a layered optical circuit, by providing a sufficiently long length of free fibers between the first and second substrates to permit the desired bending, e.g. bending for overlapping the first and second substrates/optical subcircuits without violating a minimum bend radius parameter, typically approximately one (1) inch, of each of the optical fibers within the region of the free fibers. For example, a length of approximately six (6) inches to approximately seven (7) inches has been found sufficient for bare fibers, and a length of approximately seven (7) inches to eight (8) inches has been found sufficient for ribbonized fibers. Accordingly, the length of free fibers may be bent, twisted or otherwise routed as the substrates are repositioned into a different arrangement, such as a compact overlapping layered arrangement.

In this manner, layers of the layered optical circuit are interconnected, and may communicate, via continuous communications paths, e.g. via continuous lengths of optical fiber or separate lengths of connectorized optical fibers connected by a suitable connector. This latter arrangement may be particularly useful to construct relatively large layered optical circuit having many multi-substrate optical circuits and/or optical subcircuits. Rather than routing and fixing fibers in essentially two dimensions as in a typical planar optical circuit, fibers may thereby be routed over three dimensions as multiple interconnected planar optical circuits are stacked over a given footprint area, thereby providing greater substrate area for routing of fibers per unit of footprint area.

With specific reference of the embodiment of FIG. 2A, the second portion 56 of each optical fiber is longitudinally spaced from the first portion 54 along each of the optical fibers, such that the second substrate 44 is spaced from the first substrate 42 along the length of the fibers to define a third portion 58 of each of the fibers between the first and second portions 54, 56, and between the first and second substrates 42, 44. A length of free fibers (third portion 58) between the portions attached to the substrates 60, 70 is not affixed to any substrate.

A layered optical circuit 100 (see FIGS. 3A–6C) may be fabricated from a multi-substrate optical circuit 40 (see FIGS. 2A–2C) using various techniques for positioning the second substrate in at least partially overlapping relationship to the first substrate (e.g. visually as viewed from the top). Such overlapping creates the layered effect that allows for substantial space savings as compared to having all optical circuits in a single plane.

Figure 3D:
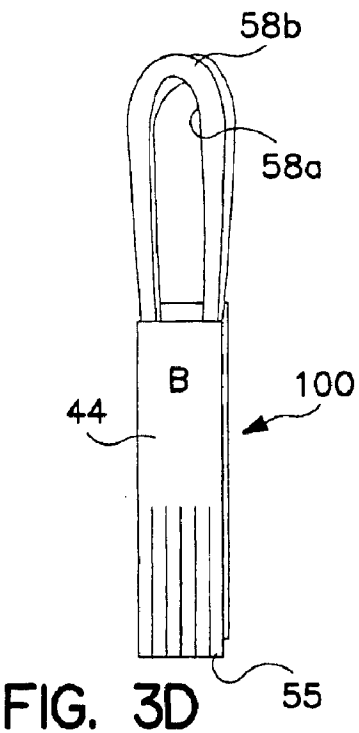
FIGS. 3A–3H illustrate formation of exemplary layered optical circuits by planar rotation.
Figure 3C:
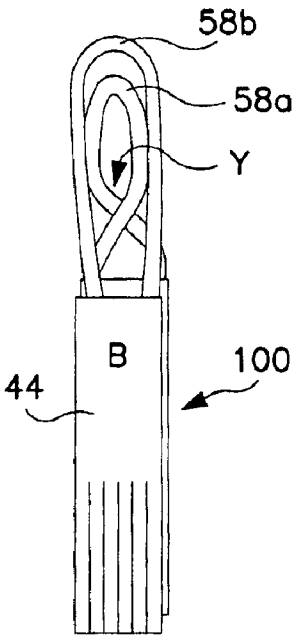
Figure 3B:
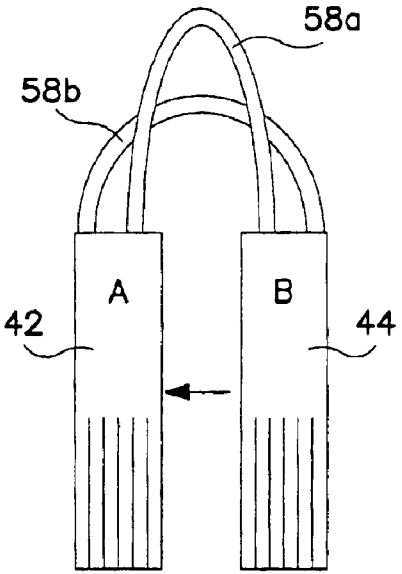
Figure 3A:
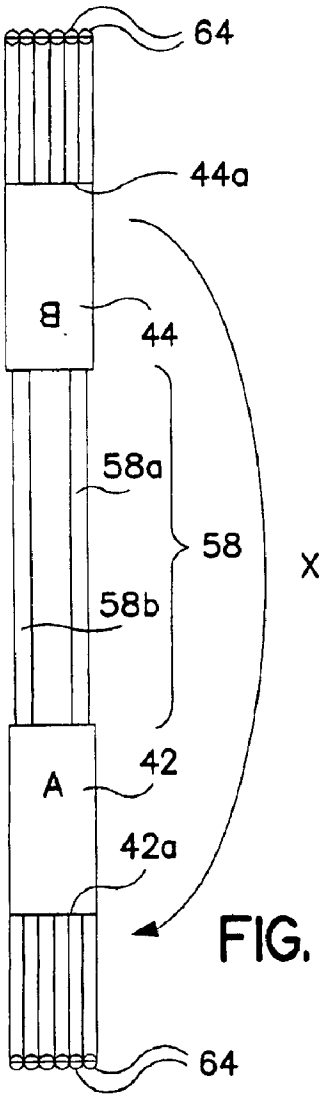
Figure 3E:
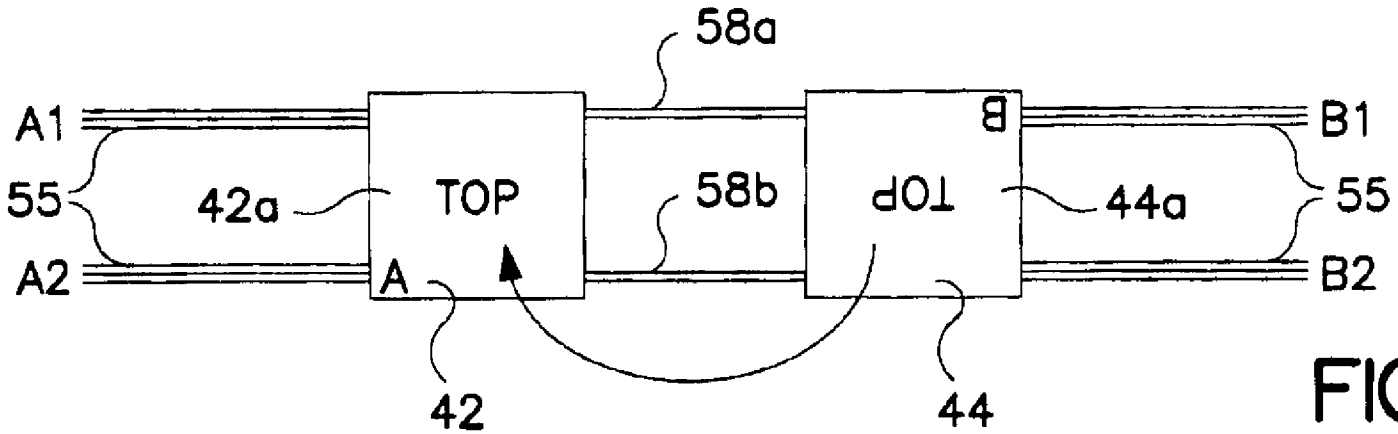
Figure 3F:
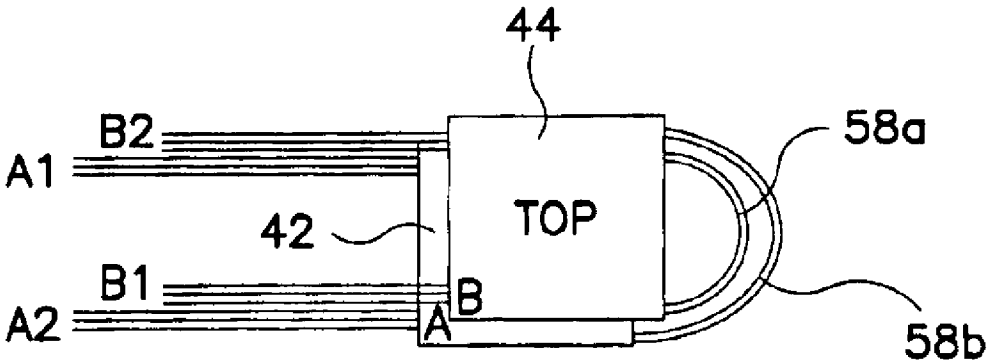

FIGS. 3A–3D show formation of an exemplary layered optical circuit 100 by a planar rotation. As shown in FIG. 3A, the second substrate 44 of the multi-substrate optical circuit 40 of FIG. 2A is rotated, in substantially a plane as shown by arrow X in FIG. 3A, until positioned adjacent the first substrate, as shown in FIG. 3B. This causes the free fibers 58*a*, 58*b* (third portions) of the fibers to form loops. The second substrate 44 is displaced out of plane, but still substantially in the same plane, to at least partially overlap the first substrate 42, as shown in FIG. 3C. This causes a twist at Y in one of the loops, which is optionally manually untwisted, as shown in FIG. 3D. As a result of this planar rotation, the side of first substrate to which the optical fibers are affixed (front side) is positioned facing the back side (opposite the side to which the optical fibers are affixed) of the second substrate. This is also shown in FIGS. 3E and 3F.

In this particular example, each of the optical fibers has a first end extending beyond an edge 42*a* of the first substrate 42, and a second end extending beyond an edge of the second substrate 44. These ends form the termination legs 55 that are positioned adjacent one another and may therefore be easily re-ribbonized and/or terminated to a connector 64, as desired. The co-location and alignment of multiple fibers/termination legs from multiple layers of the layered optical circuit is particularly well-suited to termination to a multi-row ferrule, such as recently developed multi-row MPX connectors. Additionally, such multi-substrate optical circuits permit interconnection of fibers within a row, or between rows, of a single multi-row ferrule.

Figure 3G:
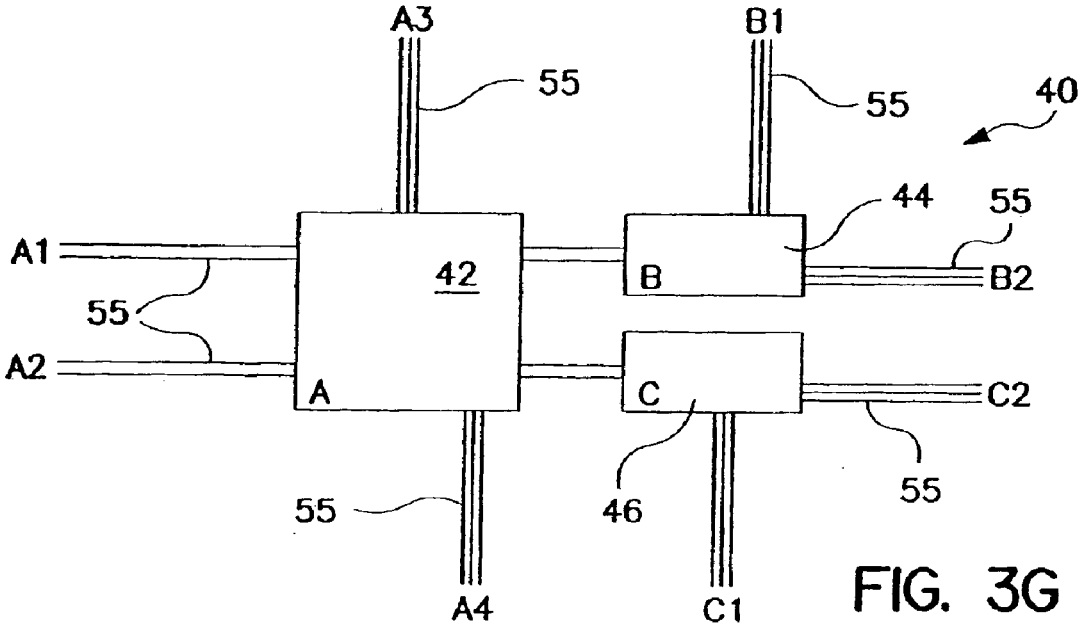
Figure 3H:
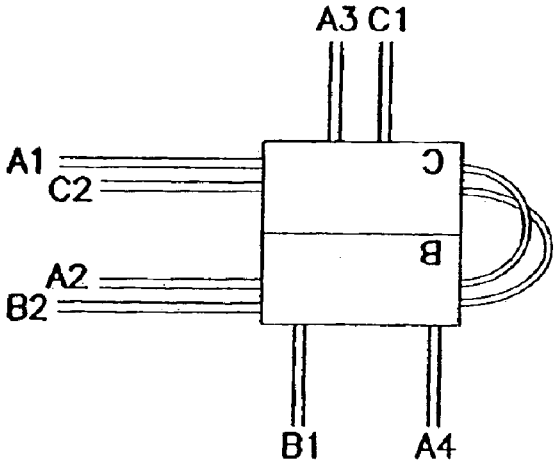

FIG. 3G shows an alternative multi-substrate optical circuit 40 including three substrates 42, 44, 46 having exemplary fiber routing (not shown) providing exemplary termination legs 55. As shown in FIG. 3H, the multi-substrate optical circuit 40 of FIG. 3G may be formed into a layered optical circuit 100 by planar rotation of substrates 44 and 46, in a manner similar to that described above with reference to FIGS. 3A–3D. In this embodiment, each of substrates 44 and 46 entirely overlap substrate 42, but do not overlap one another.

Figure 4C:
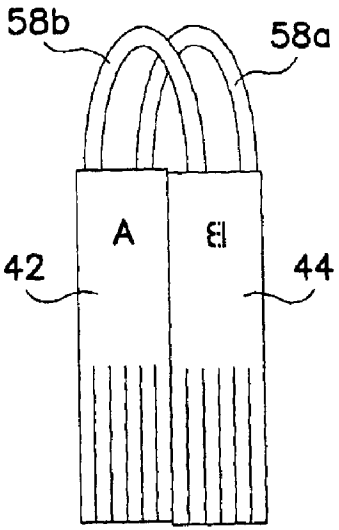
FIGS. 4A–4E illustrate formation of exemplary layered optical circuits by inversion.
Figure 4B:
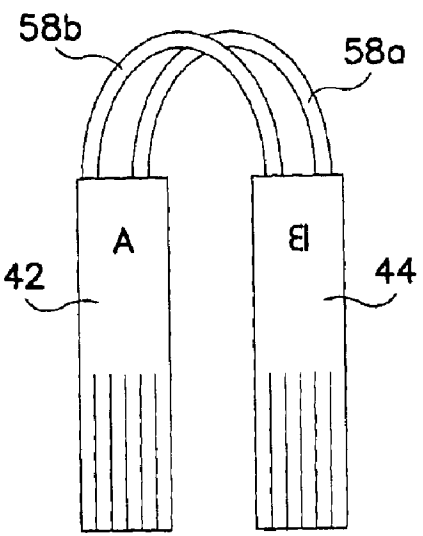
Figure 4A:
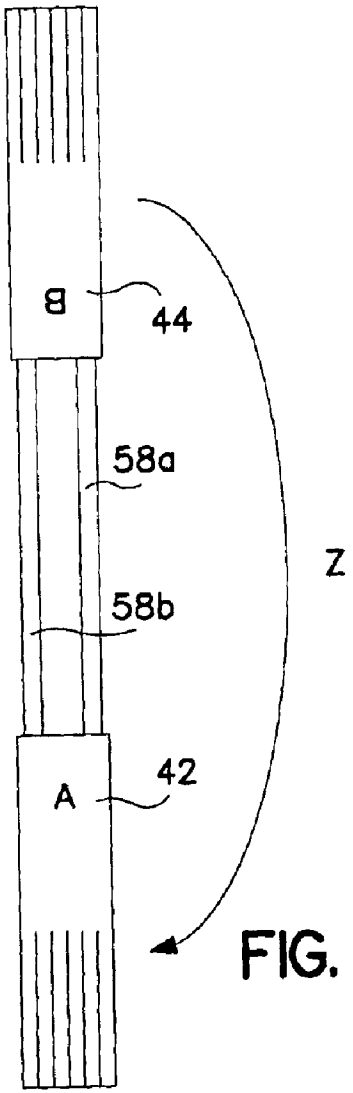

FIGS. 4A–4E show formation of exemplary layered optical circuits by inversion. For example, second substrate 44 of the multi-substrate optical circuit 40 of FIG. 2A may be rotated 180 degrees (e.g. to turn substrate 44 face down as viewed from the top in FIG. 4A) and then rotated in plane as described above with reference to FIGS. 3A–3D. Alternatively, second substrate 44 may be flipped out of plane in the direction of arrow Z of FIG. 4A to achieve the same positioning, as shown in FIG. 4B. In this manner, the side of the first and second substrates 42, 44 to which the optical fibers are affixed (front sides) are positioned facing one another, as shown in FIG. 4C, in at least partial overlapping arrangement.

Figure 4D:
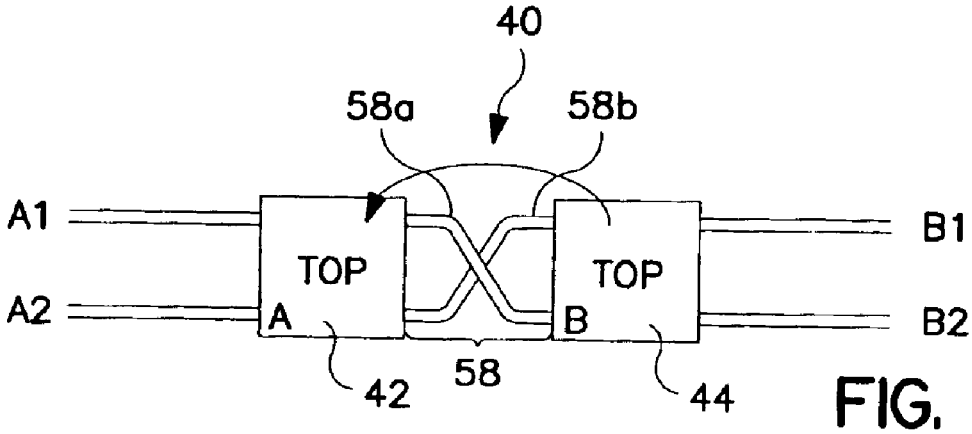
Figure 4E:
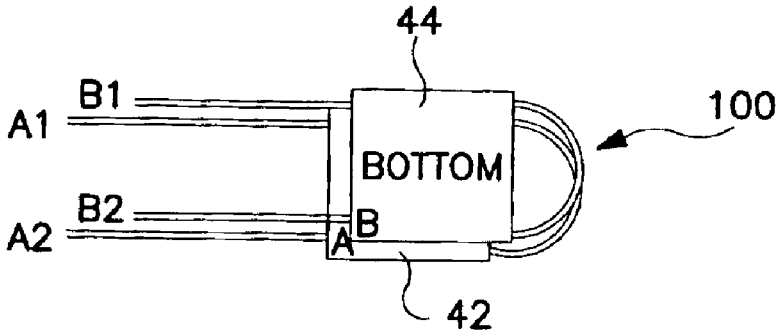

FIG. 4D shows an alternative embodiment of a multi-substrate optical circuit 40 that is similar to that shown in FIG. 2A in that it includes first and second substrates 42, 44. However, in the multi-substrate optical circuit 40 shown in FIG. 4D, the optical fibers are laid during fabrication of the multi-substrate optical circuit 40 to provide a twist in the third region 58 between the substrates 42, 44. For example, the individual portions 58*a*, 58*b* may simply be crossed as shown, or they may be twisted (i.e. to invert the ribbons between the substrates) and crossed. Accordingly, the second substrate 44 may be inverted as described above, e.g. by rotating 180 degrees out of plan and then rotating in plane or by flipping out of plane, to reposition the second substrate 44 the multi-substrate optical circuit 40 of FIG. 2A in at least partial overlapping relationship with the first substrate 42, as shown in FIG. 4E. As described above with reference to FIG. 4C, the sides of the first second substrates 42, 44 to which the optical fibers are affixed (front sides) are then facing one another in the layered optical circuit 100. In this manner, the twist in third portion 58 during fabrication of the multi-substrate optical circuit 40 is untwisted during fabrication of the layered circuit 100.

Figure 5A:
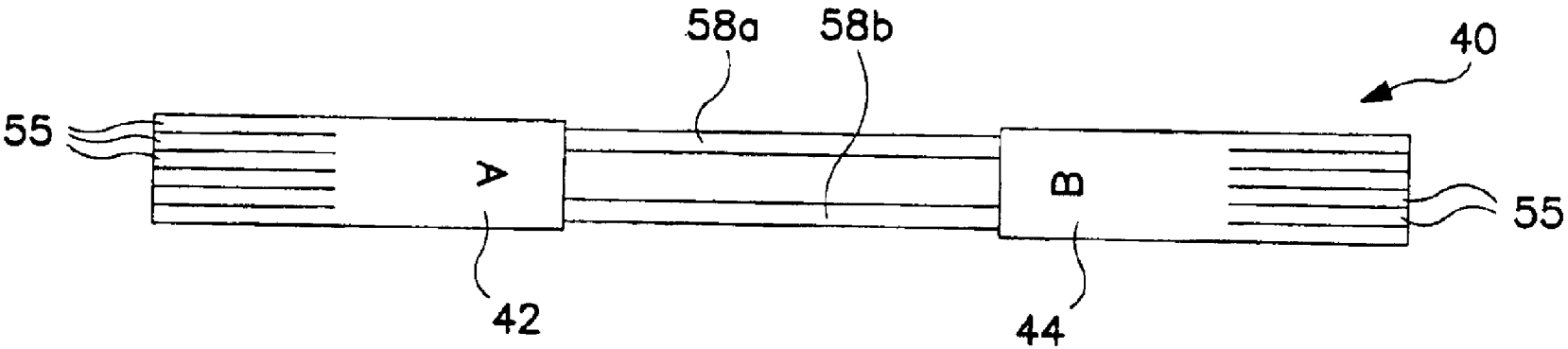
FIGS. 5A–5B illustrate formation of an exemplary layered optical circuit by translation.
Figure 5B:
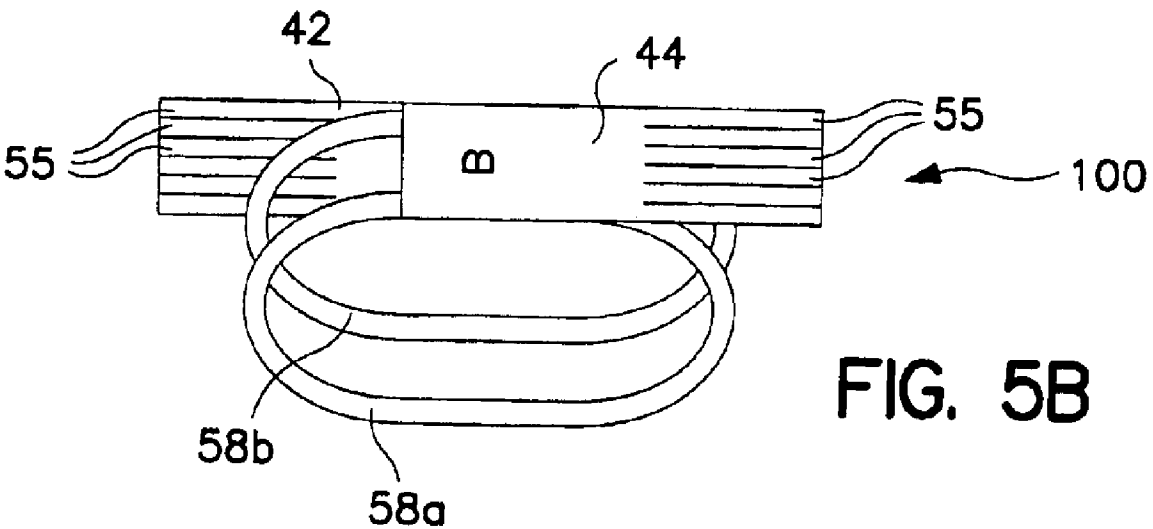

FIGS. 5A and 5B shown formation of an exemplary layered optical circuit 100 by translation. More specifically, the second substrate 44 of the multi-substrate optical circuit 40 of FIG. 2A may be simply translated, e.g. moved toward, the first substrate 42 and be displaced slightly out of plane to allow the second substrate 44 to at least partially overlap the first substrate 42 to form the layered optical circuit 100. In this particular exemplary arrangement, the various termination legs 55 of the individual substrates 42, 44 are not conveniently located for reribbonization and/or termination to a multi-row ferrule because they are positioned at opposite ends of the layered optical circuit 100.

Figure 6A:
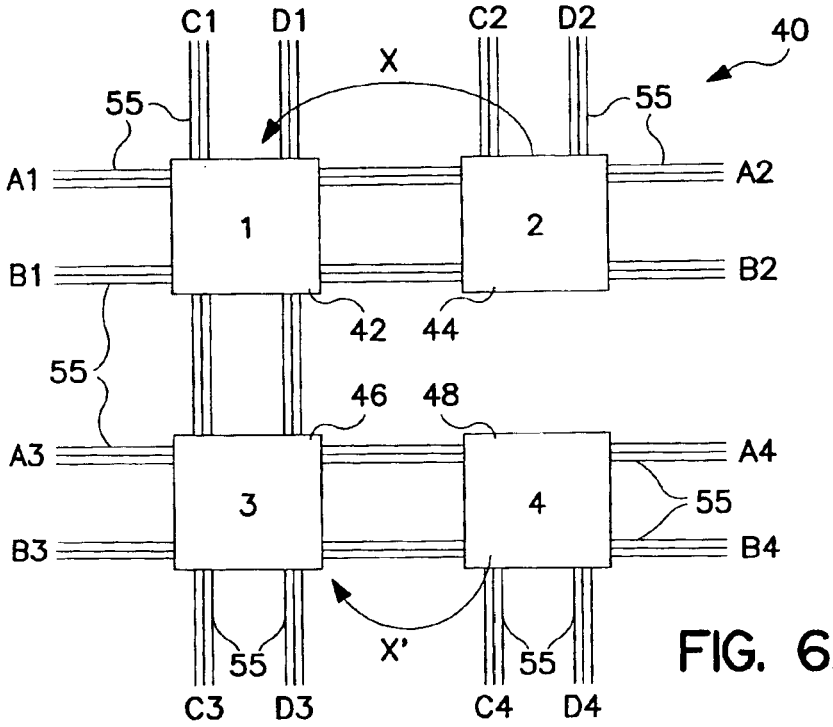
FIG. 6A is a top view of another exemplary multi-substrate optical circuit for forming a layered optical circuit in accordance with the present invention.
Figure 6C:
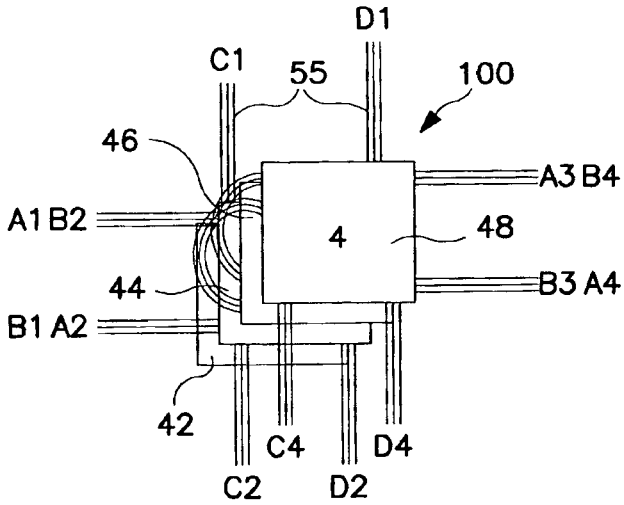
FIGS. 6B and 6C are top views of a partially and fully formed layered optical circuit, respectively, formed from the multi-substrate optical circuit of FIG. 6A.
Figure 6B:
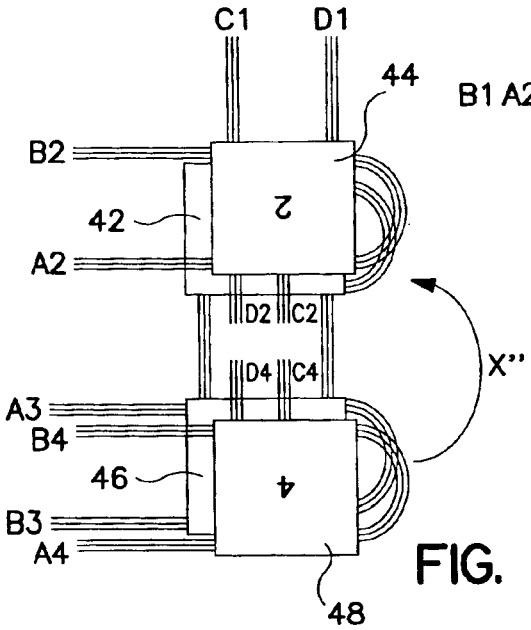

It should be appreciated that numerous layers may be stacked, using any desired combination of techniques such as planar rotation, inversion and translation, to form a layered optical circuit in accordance with the present invention. The individual planar subcircuits may be formed as discussed above, in a suitable circuit pattern to achieve the desired connectivity, fiber routing, etc. and layered optical circuit. By way of further example, FIG. 6A is a top view of another, slightly more complex, exemplary multi-substrate optical circuit 40. As shown in FIG. 6A, the multi-substrate optical circuit 40 includes four substrates 42, 44, 46, 48 supporting a plurality of optical fibers/ribbons routed in a desired circuit pattern (not shown in detail) to provide sixteen termination legs 55. As shown in FIGS. 6A and 6B, a first fabrication step includes a planar rotation (shown by arrow X) of substrate 44 to overlap substrate 44 with substrate 42. Similarly, substrate 48 undergoes a planar rotation (shown by arrow X') to overlap substrate 46. This produces the partially formed layered optical circuit 100 of FIG. 6B. Substrates 46 and 48 then undergo a planar rotation (shown by arrow X") to overlap substrates 42 and 44 to form the layered optical circuit 100 of FIG. 6C. In this example, certain termination legs 55, namely C2, C4 and D2, D4 are positioned adjacent one another for easy reribbonization and/or termination to a multi-row ferrule or other connector, as desired.

It should be noted that a multi-substrate optical circuit and a layered optical circuit in accordance with the present invention may have numerous configurations, as desired. For example, FIGS. 2B and 2C illustrate that the individual multi-substrate optical circuits 40 may include as many substrates as desired, and the individual substrates 42, 44, 46, 48 may have any shape desired to provide the desired numbers of layers and the desired connectivity and/or routing, as will be understood by those skilled in the art.

In any of the foregoing embodiments, after the substrates are positioned in at least partially overlapping relationship, they will tend to move or separate to allow the fibers to relax from their bent state. To maintain the substrates in the desired relative positions, the substrates may be affixed in fixed relative positions in any suitable manner, e.g. by adhesively or otherwise bonding the substrates to one another, mechanically fastening the substrates to one another by pins, screws, etc., or by mounting both substrates to a common carrier, such as a backplane, cabinet, etc.

A multi-substrate optical circuit may be fabricated by providing a first substrate and a second substrate in substantially the same plane as the first substrate. The second substrate is preferably positioned at a distance from the first substrate to provide a desired length between adjacent edges of the first and second substrates, as discussed further below. Alternatively, the substrates are closely positioned and a loop of desired length is left between edges of the adjacent substrates. Substrates of a type typically used for optical circuits are suitable, e.g. a flexible substrate provided with a pressure sensitive adhesive layer. For example, these substrates may be provided on a substantially planar bed of a CNC fiber routing machine typically used to fabricate optical circuits, and the fibers may be laid/routed in the usual manner, except that the fibers are routed, in part, over an area that is not provided with a substrate, and that is positioned between substrates to which the fibers are to be affixed (the free fiber area).

The fabrication includes mounting to the first substrate a first portion of each of a plurality of optical fibers. This may be performed in a traditional manner by pressing the fibers onto the pressure sensitive adhesive of a substrate, and/or providing a protective top coating as is well known in the art. This effectively forms an optical circuit of the prior art.

In accordance with the present invention, the method also involves mounting to the second substrate a second portion of each of the plurality of optical fibers. The second portion is a portion longitudinally spaced from the first portion by a third portion of each of the plurality of optical fibers. In other words, a portion of the same fibers affixed to the first substrate are then affixed to the second substrate in a similar manner, e.g. by pressing the fibers on the pressure sensitive adhesive of the second substrate and/or providing a protective layer. The second portion is thereby affixed to the second substrate to leave a third portion that has a length for permitting overlapping of the first and second substrates without exceeding a minimum bend radius of each of the optical fibers within the third portion. The length required is in part a function of the flexibility of the optical fibers (with cladding, jacketing, etc.), whether the fibers are ribbonized, and the number of fibers in the ribbon, etc. Determining a length for permitting desired bending of fibers without exceeding a minimum bend radius is well known in the art.

A layered optical circuit may then be fabricated from the multi-substrate optical circuit by positioning at least a portion of the second substrate to overlap the first substrate. The causes the portion to be displaced from the plane of the first substrate and the substrates to overlie one another to create a space savings. As discussed above, the positioning of the substrates in a layered orientation may include a planar rotation, a planar translation or an inversion of at least one of the substrates. Preferably, the layered substrates are then affixed in fixed relative positions.

Optionally, mounting of fibers to the second substrate may involve twisting the plurality of optical fibers in a transition area (third portion) defined between the first and second portions of the optical fibers, such that the inversion of the substrate(s) tends to untwist the optical fibers. Alternatively, a twist may be built into the fibers of the multi-substrate optical circuit, as discussed above, such that the inversion tends to untwist the fibers.

The layered optical circuit may then be used substantially similarly to a planar optical circuit of the prior art, e.g. by terminating the termination legs to desired connectors, mounting the layered optical circuit on a carrier, backplane, cabinet, etc. and/or connecting the layered optical circuit to other circuits, signal transmission hardware, etc.

Having thus described particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A multi-substrate optical circuit for forming a layered optical circuit, the multi-substrate optical circuit comprising:

a plurality of optical fibers, each having a first, second and third portion;

a first substrate supporting said first portions of said plurality of optical fibers to form a first optical subcircuit; and a second substrate supporting said second portions of said plurality of optical fibers to form a second optical subcircuit;

wherein said third portions of said plurality of optical fibers connects said first and second portions and comprise free fibers having sufficient length to ensure at least a minimum bend radius of said plurality of optical fibers.

2. A layered optical circuit comprising:

a plurality of optical fibers, each having a first, second and third portion;

a first substrate supporting said first portions of said plurality of optical fibers to form a first optical subcircuit; and a second substrate supporting said second portions of said plurality of optical fibers to form a second optical subcircuit, said respective second portion being longitudinally spaced from said respective first portion along each of said plurality of optical fibers;

wherein said second substrate is positioned to at least partially overlap said first substrate.

3. The layered optical circuit of claim 2, wherein said second substrate entirely overlaps said first substrate.

4. The layered optical circuit of claim 2, wherein each said third portion connects respective first and second portions, said third portion having sufficient length to ensure at least a minimum bend radius between said respective first and second portions.

5. The layered optical circuit of claim 2, wherein each of said first and second substrates has a front side to which said plurality of optical fibers is affixed, and a back side opposite said front side, and wherein said front side of said second substrate is positioned facing said front side of said first substrate.

6. The layered optical circuit of claim 2, wherein each of said first and second substrates has a front side to which said plurality of optical fibers is affixed, and a back side opposite said front side, and wherein said front side of said second substrate is positioned facing said back side of said first substrate.

7. The layered optical circuit of claim 2, wherein said second substrate is mounted in fixed position to said first substrate.

8. The layered optical circuit of claim 2, wherein at least one of said plurality of optical fibers has a first end extending beyond an edge of said first substrate, and a second end extending beyond another edge of said second substrate.

9. The layered optical circuit of claim 8, wherein each of said first and second ends of said plurality of optical fibers is terminated to a fiber optic connector.

10. The layered optical circuit of claim 8, wherein said second substrate is bonded to said first substrate.

11. The layered optical circuit of claim 8, wherein said second substrate is mechanically fastened to said first substrate.

12. The layered optical circuit of claim 8, wherein said second substrate and said first substrate are affixed to a carrier.

13. A method for fabricating a layered optical circuit, the method comprising:

providing a first substrate;

providing a second substrate in spaced relationship to said first substrate, said first and second substrates being positioned in substantially the same plane;

affixing to said first substrate a first portion of a plurality of optical fibers;

affixing to said second substrate a second portion of said plurality of optical fibers, said second portion being longitudinally spaced from said first portion; and positioning at least a portion of said second substrate to overlap said first substrate, said portion being displaced from the plane of said first substrate.

14. The method of claim 13, wherein positioning at least a portion of said second substrate comprises a planar rotation of said second substrate.

15. The method of claim 13, wherein positioning at least a portion of said second substrate comprises a planar translation of said second substrate.

16. The method of claim 13, further comprising:

mounting said second substrate in fixed position to said first substrate.

17. The method of claim 13, wherein positioning at least a portion of said second substrate comprises an inversion of said second substrate.

18. The method of claim 17, wherein mounting to said second substrate a second portion of each of said plurality of optical fibers comprises twisting said plurality of optical fibers in a transition area defined between said first and second portions of said plurality of optical fibers, whereby the inversion of said second substrate untwists said plurality of optical fibers.

19. A method for fabricating a multi-substrate optical circuit, the method comprising:

providing a first substrate;

providing a second substrate in substantially the same plane as said first substrate;

mounting to said first substrate a first portion of each of a plurality of optical fibers; and mounting to said second substrate a second portion of each of said plurality of optical fibers, said second portion being longitudinally spaced from said first portion by a third portion of each of said plurality of optical fibers, said third portion having a length for overlapping said first and second substrates without exceeding a minimum bend radius of each of said plurality of optical fibers within said third portion.

20. The method of claim 19, wherein providing said second substrate comprises positioning said second substrate at a distance from said first substrate to provide the length between adjacent edges of said first and second substrates.

21. A multi-substrate optical circuit for forming a layered optical circuit, the multi-substrate optical circuit comprising:

a first optical subcircuit comprising a plurality of optical fibers supported on a first substrate in a first circuit pattern, a first end of each of said plurality of optical fibers extending beyond an edge of said first substrate to provide a first termination leg; and a second optical subcircuit comprising said plurality of optical fibers supported on a second substrate in a second circuit pattern, a second end of each of said plurality of optical fibers extending beyond a respective edge of said second substrate to provide a second termination leg, said first plurality of optical fibers providing a continuous communication path between respective first and second termination legs and across said first and second substrates.

22. The multi-substrate optical circuit of claim 21, wherein said continuous communication path has a length between said edge of said first substrate and said respective edge of said second substrate permitting at least partial overlapping of said first and second optical subcircuits without exceeding a minimum bend radius of said plurality of optical fibers.

* * * * *